US006416873B1

(12) United States Patent
Hara et al.

(10) Patent No.: US 6,416,873 B1

(45) **Date of Patent: *Jul. 9, 2002**

(54) INTERMEDIATE TRANSFER MATERIAL AND IMAGE-FORMING APPARATUS

(75) Inventors: Yukio Hara, Minamiashigara; Shinichi Ishigame, Ebina; Akiko Kimura; Shigeru Fukuda, both of Minamiashigara, all of (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,724

(22) Filed: Dec. 3, 1999

(30) Foreign Application Priority Data

Feb. 8, 1999 (JP) .......................................... 11-030667

(51) Int. Cl.[7] .......................... B32B 27/00; B32B 27/06

(52) U.S. Cl. ..................... 428/473.5; 524/602; 524/555

(58) Field of Search ....................... 428/473.5; 524/602, 524/555

(56) References Cited

U.S. PATENT DOCUMENTS

| | | | | | |
|---|---|---|---|---|---|
| 5,912,101 | A | * | 6/1999 | Karaki et al. | 430/110 |
| 5,978,639 | A | * | 11/1999 | Masuda et al. | 399/302 |
| 6,009,297 | A | * | 12/1999 | Maeda et al. | 399/302 |
| 6,030,737 | A | * | 2/2000 | Ugai et al. | 430/106 |
| 6,044,243 | A | * | 3/2000 | Hara | 399/302 |
| 6,077,636 | A | * | 6/2000 | Moriki et al. | 430/45 |

FOREIGN PATENT DOCUMENTS

| | | |
|---|---|---|
| JP | 5-200904 | 8/1993 |
| JP | 6-95521 | 4/1994 |
| JP | 6-149079 | 5/1994 |
| JP | 6-149081 | 5/1994 |
| JP | 6-149083 | 5/1994 |
| JP | 6-228335 | 8/1994 |
| JP | 2560727 | 9/1996 |

* cited by examiner

*Primary Examiner*—Bruce H. Hess
*Assistant Examiner*—B. Shewareged
(74) *Attorney, Agent, or Firm*—Oliff & Berridge, PLC

(57) ABSTRACT

An intermediate transfer material which is disposed between a latent image-carrier and a recording medium and is primary-transferred thereon a toner image formed on the latent image-carrier, wherein the intermediate transfer material is formed by a polyimide resin having dispersed therein an electrically conductive agent and having a glass transition temperature of 245° C. or lower, and an image-forming apparatus using the above-described intermediate transfer material. The intermediate transfer material does not give image defects such as white spots, etc., caused by lowering of resistivity by the influence of a transferring electric field.

3 Claims, 6 Drawing Sheets

SECONDARY TRANSFERRING PORTION

INTERMEDIATE TRANSFER MATERIAL AND IMAGE-FORMING APPARATUS

FIELD OF THE INVENTION

The present invention relates to an image-forming apparatus using an electrophotographic system, such as a copying machine, a printer, etc., and an intermediate transfer material which is used for the image-forming apparatus, and particularly to an intermediate transfer material onto which a toner image formed in a latent image-carrier is primary-transferred and also to an image-forming apparatus obtaining a reproduced image by transferring the toner image transferred to the intermediate transfer material onto a recording medium such as a paper, etc.

BACKGROUND OF THE INVENTION

In an image-forming apparatus using an electrophotographic system, a uniform electrostatic charge is formed on an electrostatic latent image-carrier which is a photoconductive photoreceptor formed by an inorganic or organic material and after forming an electrostatic latent image on the latent image-carrier by a laser light, etc., of a modulated image signal, the electrostatic latent image is developed with a charged toner to form a visualized toner image. Also, by electrostatically transferring the toner image onto a recording medium such as a recording paper, etc., directly or via an intermediate transfer material to obtained a desired reproduced image.

In particular, an image-forming apparatus employing a system wherein a toner image formed on the above-descried latent image-carrier is primary-transferred onto an intermediate transfer material and further the toner image on the intermediate transfer material is secondary-transferred onto a recording paper is known as disclosed in Japanese Patent Laid-Open No. 206567/1987, etc.

As the intermediate transfer material used for the image-forming material, the electrically conductive endless belts of thermoplastic resins such as polycarbonate resins (Japanese Patent Laid-Open No. 95521/1994), PVDE (polyvinylidene fluoride) (Japanese Patent Laid Open Nos. 200904/1993 and 228335/1994), polyalkylene phthalates (Japanese Patent Laid Open No. 149081/1994), a blended material of PC(polycarbonate)/PAT(polyalkylene terephthalate) (Japanese Patent Laid Open No. 149083/1994), a blended material of ETFE (ethylene-tetrafluoroethylene copolymer)/PC, ETFE/PAT, or PC/PAT (Japanese Patent Laid Open No. 149079/1994), etc., are proposed.

However, because the electrically conductive material of the thermoplastic resin such as a polycarbonate resin, PVDF (polyvinylidene fluoride), etc., is inferior in the mechanical characteristics (Young's modulus 24,000 kg/cm$^2$ or lower), the deformation of the belt to the stress at driving is large, whereby transferred images having a high quality are not stably obtained. Also, because cracks occur from the end portion of the belt at driving, the belt life is short.

As a material excellent in the mechanical characteristics, there is a polyimide resin and for example, in Japanese Patent Laid Open No. 311263/1988 (U.S. Pat. No. 2,560,727), a polyimide seamless belt having dispersed therein carbon black is proposed.

In a general molding method of the above-described polyimide belt, a film-forming base liquid which is a polyamide solution having dispersed therein an electrically conductive agent is poured in a cylindrical mold, and by rotating the cylindrical mold at a rotation number of from 500 to 2000 rpm while heating to a temperature of, for example, from 100 to 200° C., a film is formed by a centrifugal molding method. Then, the film obtained is drawn from the mold in a semi-cured state and put over an iron core, and is polyimidated (ring-closing of polyamidic acid) at a high temperature of at least 300° C. to carry out curing the belt.

Also, there is a method of casting the film-forming base liquid on a metal sheet at a uniform thickness, heating the case film at a temperature of from 100 to 200° C. as described above to remove the greater part of the solvent, thereafter, raising the temperature stepwise to a high temperature of at least 300° C. to form a polyimide film, and adhering both the ends of the film with an adhesive, etc., to form a endless belt.

In the case of using an intermediate transfer material formed with a thermoplastic resin such as polycarbonate having dispersed therein carbon black, an ethylene-tetrafluoroethylene copolymer having dispersed therein carbon black, etc.; or a polyimide resin having dispersed therein carbon black as in the prior art described above under a low-temperature low-humidity environment of 10° C., 15% RH, when after continuously transferring toner images onto 3,000 or more transfer papers having a width shorter than the width of he intermediate transfer material, such as post cards (10 cm in width), a half tone (magenta 30%) image is transferred, the white spots are formed at the paper traveling portion as shown in FIG. 5. The occurrence of the e-white spots is caused by that because directly after the secondary transfer, the surface of the belt is charged to a plus side and belt side of the transfer paper is charged to a minus side as shown in FIG. 6, a releasing discharge occurs between the belt and the paper, whereby the surface resistivity of the paper traveling portion of the intermediate transfer material is lowered than those of the peripheral portions thereof and thus the transferring efficiency of the paper traveling portion is lowered than the transferring portion of the peripheral portions.

SUMMARY OF THE INVENTION

The present invention can solve the above-described problems in the techniques in prior art and also provide an intermediate transfer material and an image-forming apparatus using it capable of providing images of high image quality without lowering the surface resistivity of a paper traveling portion than those of the peripheral portions thereof and without causing image-quality defects such as white spots, etc., even when toner images are continuously transferred (transferring voltage is applied to the intermediate transfer material) to 3,000 or more transfer papers having a width shorter than the width of the intermediate transfer material, such as post cards, etc., under a low-temperature and low-humidity environment of 10° C. and 15% RH.

That is, according to an aspect of this invention, there is provided an intermediate transfer material which is disposed between a latent image-carrier and a recording medium and is primary-transferred thereon a toner image formed on the latent image-carrier, wherein the intermediate transfer material is formed by a polyimide resin having dispersed therein an electrically conductive agent and having a glass transition temperature of 245° C. or lower.

In the above-described intermediate transfer material, it is preferred that the above-described polyimide resin is a polybiphenyltetracarboxylic acid-base polyimide resin. Also, the surface resistivity of the intermediate transfer material is preferably in the range of from $10^{10}$ to $10^{14}$ Ω/□.

Also, according to another aspect of this invention, there is provided an image-forming apparatus having a latent image-carrier forming thereon an electrostatic latent image according to an image information, a developing apparatus for visualizing the electrostatic latent image formed on the latent image-carrier as a toner image, an intermediate transfer material primary-transferred thereon the toner image carried on the latent image-carrier, and a secondary transferring apparatus for secondary-transferring the toner image on the intermediate transfer material onto a recording medium, wherein as the intermediate transfer material, the above-described intermediate transfer material is used.

The intermediate transfer material of this invention is formed by a polyimide resin having a glass transition temperature of 245° C. or lower. The polyimide resin is obtained by a dehydrocondensation reaction of a tetracarboxylic acid dianhydride or the derivative thereof and a diamine. The dehydrocondensation reaction is finished in the temperature region of at least 330° C. For example, the glass transition point of a polybiphenyltetracarboxylic acid-base polyimide resin obtained by finishing the dehydrocondensation reaction carried out by heating to a temperature of 330° C. for 20 minutes was 260° C. It has been discovered that when the dehydrocondensation reaction is carried out at a temperature of 300° C. or lower, a polyimide resin having a glass transition point of 245° C. or lower is obtained and by using the polyimide resin for an intermediate transfer material, the lowering amount of the surface resistivity of the paper traveling portion is reduced, and the invention has been accomplished.

The reason that the glass transition point shifts to a low-temperature side is considered to be that the dehydrocondensation reaction of the above-described tetracarboxylic acid dianhydride and a diamine is not completed and by the existence of a part of the unreacted tetracarboxylic acid dianhydride or diamine, the resistance lower at the secondary transferring portion is reduced.

BRIEF DESCRIPTION OF THE DRAWINGS

Preferred embodiments of intermediate transfer material and image forming apparatus according to the present invention will be described in detail based on the drawings.

DETAILED DESCRIPTION OF THE INVENTION

Figure 1:
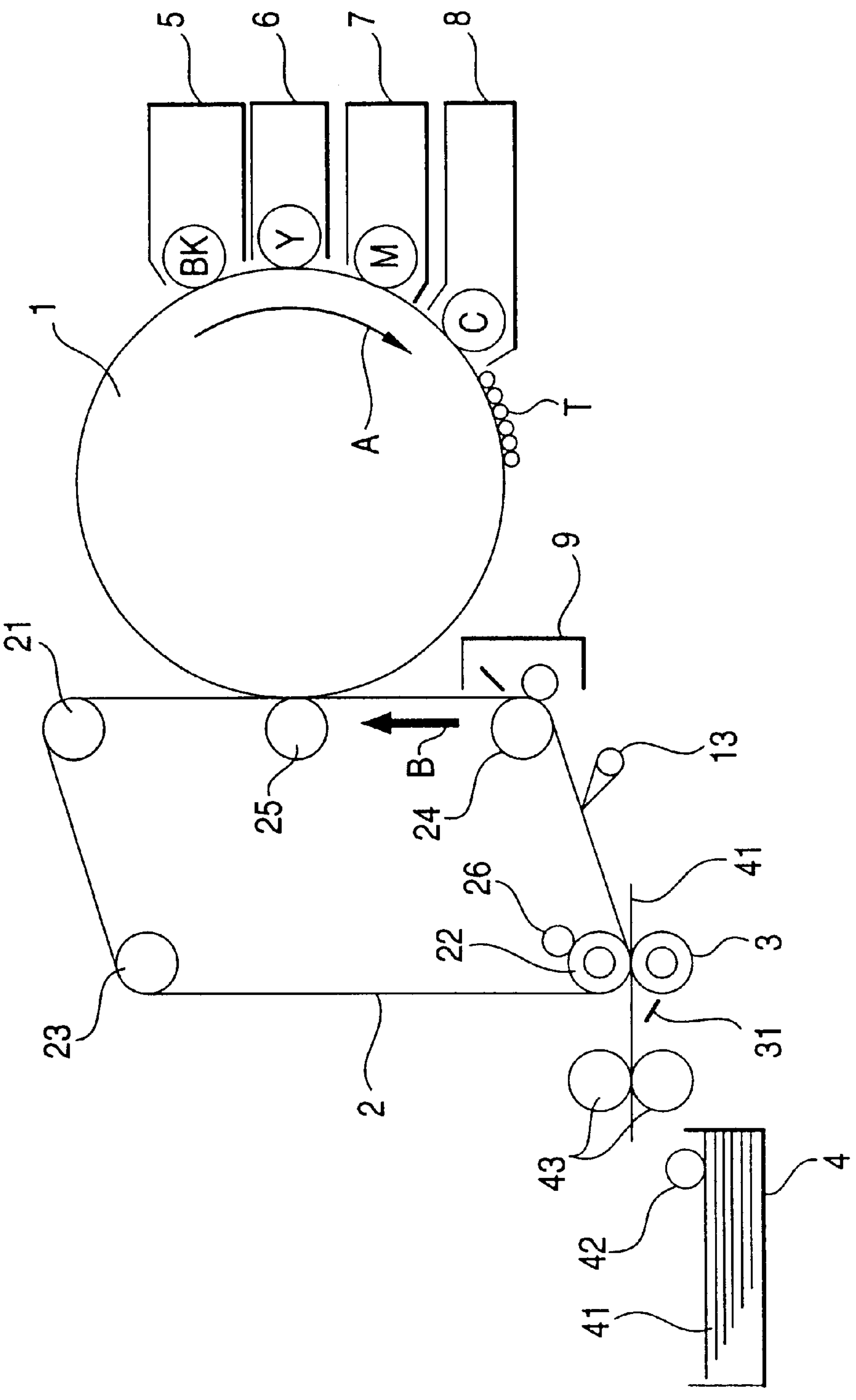
FIG. 1 is a schematic view showing an embodiment of a color electrophotographic copying machine to which the present invention is applied.

Then, the present invention is described in detail.

The polyimide resin used for the intermediate transfer material of this invention can be formed by heating polyamic acid which is the precursor. Polyamic acid can be obtained by dissolving an almost equimolar mixture of tetracarboxylic acid dianhydride or the derivative thereof and a diamine in an organic polar solvent and reacting both the components in a solution state. In the preparation liquid of the polyamic acid, examples of the tetracarboxylic acid dianhydride include pyromellitic acid, naphthalene-1,4,5,8-tetracarboxylic acid, naphthalene-2,3,6,7-tetracarboxylic acid, 2,3,5,6-biphenyltetracarboxylic acid, 2,2',3,3'-biphenyltetracarboxylic acid, 3,3', 4,4'-biphenyltetracarboxylic acid, 3,3',4,4'-diphenyl ether tetracarboxylic acid, 3,3',4,4'-benzophenonetetracarboxylic acid, 3,3',4,4'-diphenylsulfone tetracarboxylic acid, 3,3',4,4'-azobenzenetetracarboxylic acid, bis(2,3-dicarboxyphenyl) methane, bis(3,4-dicarboxyphenyl)methane, β,β-bis(3,4-dicarboxyphenyl)propane, and β,β-bis(3,4-dicarboxyphenyl)hexafluoropropane.

Also, examples of the diamine component include m-phenyldiamine, p-phenyldiamine, 2,4-diaminotoluene, 2,6-diaminotoluene, 2,4-diaminochlorobenzene, m-xylylenediamine, p-xylylenediamine, 1,4-diaminonaphthelene, 1,5-diaminonaphthalene, 2,6-diaminonaphthalene, 2,4'-diaminonaphthalbiphenyl, benzidine, 3,3-dimethylbenzidine, 3,3'-dimethoxybenzidine, 3,4'-diaminophenyl ether, 4,4'-diaminodiphenyl ether (oxy-p,p'-dianiline: ODP), 4,4'-diaminodiphenyl sulfide, 3,3'-diaminobenzophenone, 4,4'-diamonophenylsulfone, 4,4'-diaminoazobenzene, 4,4'-diaminophenylmethane, and β,β-bis(4-aminophenyl)propane.

Practically, the polyimide resin includes a polypyromellitic acid imide-base imide resin such as Kapton HA, trade name, manufactured by Du Pont de Nemours and Company; a polybiphenyltetracarboxylic acid imide-base resin such as Upilex S, etc., trade name, manufactured by Ube Industries, Ltd.; a polybenzophenonetetracarboxylic acid-base resin such as Upilex R, trade name, manufactured by Ube Industries, Ltd., and LARC-TPI (thermoplastic polyimide resin), trade name, manufactured by MITSUI TOATSU CHEMICALS, INC., etc.

In these resins, the polybiphenyltetracarboxylic acid-base polyimide resin shown by the following formula obtained by the dehydrocondensation reaction of biphenyltetracarboxylic acid dianhydride and oxydianiline is preferred.

Chemical Formula

The polyimide resin having a glass transition temperature of 245° C. or lower can be obtained by carrying out the dehydrocondensation reaction of the above-described tetracarboxylic acid and the diamine at a temperature of 300° C. or lower.

The surface resistivity of the transferring surface of the intermediate transfer material is in the range of from $1\times10^{10}$ Ω/□ to $1\times10^{14}$ Ω/□, and preferably from $1\times10^{11}$ Ω/□ to $1\times10^{12}$ Ω/□.

If the surface resistivity of the intermediate transfer material is higher than $1\times10^{14}$ Ω/□, a release discharge generates at a post nip portion of releasing the latent image-carrier from the intermediate transfer material and at the portion of generating the discharge, the white spots occur. Also, if the surface resistivity of the intermediate transfer material is lower than $1\times10^{10}$ Ω/□, the charge at the transferring portion cannot be maintained to lower the transferring efficiency.

By making the surface resistivity of the transferring surface of the intermediate transfer material the above-described range, a high image quality can be stably obtained.

In addition, the value of the surface resistivity is obtained from the electric current value after 30 seconds by applying a voltage of 100 V to the intermediate transfer material using an HR probe of High Rester IP, trade name, manufactured by Mitsubishi Yuka K.K.

Examples of the electrically conductive agent imparting an electric conductivity, which is dispersed in the polyimide resin for obtaining the above-described surface resistivity, include the fine particles of carbon black, graphite, metals or alloys such as aluminum, copper alloys, etc.; and metal oxides such as tin oxide, zinc oxide, potassium titanate, a tin oxide-indium oxide composite oxide and a tin oxide-antimony oxide complex oxide. The above-described electrically conductive agents may be used singly or as combination of them. In these materials, carbon black is preferred. The carbon black used in this invention includes furnace black, ketchen black, channel black, etc., and more practically, there are granular acetylene black (oil absorption 288 ml/100 g), manufactured by DENKI KAGAKU KOGYO K.K., HS-500 (oil absorption 477 ml/100 g), Asahi Thermal FT (oil absorption 28 ml/100 g), and Asahi Thermal MT (oil absorption 35 ml/100 g) manufactured by Asahi Carbon K.K., Ketchen black (oil absorption 360 ml/100 g) manufactured by Lion Akzo K.K., Balkan XC-72 (oil absorption 265 ml/100 g) manufactured by Cabot Corporation, Special Black 4, manufactured by Tegsa Co., etc.

The electrically conductive agent is generally added to the polyimide resin in an amount of from 11 to 15% by weight but the amount may be outside the range.

There is no particular restriction on the image-forming apparatus of this invention if the apparatus is an image-forming apparatus of a intermediate transfer material system. The present invention is applied to an ordinary monocolor image-forming apparatus containing only a monochromatic toner in the developing apparatus, a color image-forming apparatus of successively repeating primary transferring of a toner image carried on a latent image-carrier such as a photoreceptor drum, etc., onto an intermediate transfer material, a tandem-type color image-forming apparatus wherein plural latent image-carriers each equipped with a developing device of each color are disposed in series on an intermediate transfer material, etc.

As an embodiment, a schematic view of a color image-forming apparatus of repeating primary transferring is shown in FIG. 1.

FIG. 1 is a schematic view explaining the essential portion of an image-forming apparatus to which the invention is applied. In FIG. 1, the numeral 1 is a photoreceptor drum as a latent image-carrier, 2 is a transfer belt as an intermediate transfer material, 3 is a bias roll as a rotary electrode, 4 is a tray for supplying recording papers 41 as recording media, 5 is a developing apparatus by a B (black) toner, 6 is a developing device by a Y (yellow) toner, 7 is a developing apparatus by an M (magenta) toner, 8 is a developing apparatus by a C (cyan) toner, 9 is a belt cleaner, 13 is a releasing claw, 21, 23, and 24 are belt rollers, 22 is a backup roller, 25 is an electrically conductive roller, 26 is an electrode roller, 31 is a cleaning blade, 42 is a pickup roller, and 43 is feed rollers.

In the figure, the photoreceptor 1 is rotated to the direction of an arrow A and the surface is uniformly charged by a charging device (not shown). An electrostatic latent image of a 1st color (for example, B) is formed on the charged photoreceptor drum 1 by an image writing means such as a laser writing device, etc.

The electrostatic latent image is developed by a developing apparatus 5 to form a visualized toner image T. The toner image T reaches a primary transferring portion at with an electrically conductive roll 25 is disposed by the rotation of the photoreceptor drum 25 and by acting an electric field of the reverse polarity to the toner image T from the electrically conductive roll 25, while electrostatically adsorbing the toner image T to the transfer belt 2, the toner image T is primary-transferred onto the transfer belt by the rotation of the transfer belt 2 to the direction of an arrow B.

Then, by the same way, a toner image of a 2nd color, a toner image of a 3rd color, and a toner image of a 4th color are successively formed and piled up at the transfer belt 2 to form a multilayer toner image.

The multilayer toner image transferred onto the transfer belt 2 reaches a secondary transferring portion at which a bias roll 3 is disposed by the rotation of the transfer belt 2.

The secondary transferring portion is composed of the bias roll 3 disposed at the front surface side of the transfer belt 2 carrying the toner image, the backup roll 22 disposed at the back surface side of the transfer belt 2 facing the bias roll 3, and the electrode roll 26 rotating in contact with the backup roll 22.

The recording paper 41 is taken out one by one from the recording paper bundle contained in the tray 4 by the pickup roller 42 and sent between the transfer belt 2 and the bias roll 3 of the secondary transferring portion by the feed roll 43 at a definite timing.

Onto the recording paper supplied is transferred the toner image carried on the transfer belt 22 by the press-conveying by the bias roll 3 and the backup roll 22 and the rotation of the transfer belt 2.

The recording paper 41 having the transferred toner image is released from the transfer belt 2 by acting the releasing claw 13 at a standby position until finishing the primary transfer of the final toner image, is conveyed to a fixing apparatus (not shown), and the toner image on the recording paper 4 is fixed by a press-heating treatment to become a permanent image.

In addition, after finishing the transfer of the multilayer toner image onto the recording paper 41, the toner remaining on the transfer belt 2 is removed by the belt cleaner disposed at the downstream of the secondary transferring portion, and the transfer belt 2 is provided for next transferring. Also, the bias roll 3 is equipped with the cleaning blade 31 made of polyurethane, etc., such that the blade is always in contact with the surface of the bias roll and foreign matters such as toner particles, paper dust, etc., attached thereto by transferring are removed.

In the case of the transfer of a monochromatic image, the primary-transferred toner image T is immediately secondary-transferred and is conveyed to a fixing apparatus but in the case of transferring a multicolor image by piling plural colors, the rotation of the transfer belt 2 is synchronized with the rotation of the photoreceptor drum 1 so that the toner image of each color is correctly correspond to each other at the primary-transferring portion to avoid the occurrence of the discrepancy of the position of the toner image of each color.

At the above-described secondary transferring portion, by applying a voltage (transferring voltage) of the same polarity as the polarity of the toner image to the electrode roll 26 in contact with the backup roll 22 disposed facing the bias roll 3 via the transfer belt 2, the toner image is transferred onto the recording paper 11 by an electrostatic repulsion.

The following examples are intended to illustrate the invention practically but not to limit the invention in any way.

EXAMPLE 1

A film-forming base liquid obtained by mixing a heat-resisting film-forming polyimide, U Varnish A, manufactured by Ube Industries, Ltd., with 13% by weight carbon black as an electrically conductive agent by a mixer, etc., was uniformed cased on a metal sheet, dried in the atmosphere of 120° C. for 120 minutes, and was cured (causing imidation reaction) by further stepwise raising the temperature as 150° C. for 30 minutes, 200° C. for 90 minutes, and 220° C. for 20 minutes to obtain a polybiphenyltetracarboxylic acid-base polyimide resin film of 80 $\mu$m in thickness having a surface resistivity of $10^{12}$ Ω/□. The glass transition point of the polyimide resin film was 194° C. The end portions (10 mm) of the polyimide resin film having dispersed therein carbon black were superposed each other and the portions were adhered using a one part type elastic adhesive ("Super X 8008", trade name, manufactured by Cemedyne K.K. to obtain an endless belt. Furthermore, when using the endless belt, continuous printing was carried out on 3,000 recording papers, the resistance lowering amount of the paper traveling portion was 0.25 log Ω/□. When the surface resistivity of the paper traveling portion is lowered than the surface resistivity of the peripheral portions by 1.1 figures (log Ω/□) or more, the white spots occur.

In addition, the measurements of the surface resistivity and the volume resistivity were carried out using an HR probe of High Rester IP, manufactured by Mitsubishi Yuka K.K. and applying a voltage of 100 V to the polyimide resin belt, and the resistivities were obtained from the electric current values after 30 seconds.

Also, the glass transition point was obtained using a Shimadzu heat flux differential calorimeter DSC (differential scanning calorimeter)–50, manufactured by SHIMADZU CORPORATION and raising temperature in an air atmosphere to 450° C. at a temperature-raising rate of 10° C./minute.

EXAMPLE 2

The film-forming base liquid obtained as in Example 1 was uniformly cased on a metal sheet, dried in an atmosphere of 120° C. for 120 minutes, and cured (causing imidation reaction) by further stepwise raising temperature as 150° C. for 30 minutes, 200° C. for 30 minutes, 220° C. for 30 minutes, and 250° C. for 20 minutes to obtain a polyimide resin film of 80 $\mu$m in thickness having a surface resistivity of $10^{11.8}$ Ω/□. The glass transition point of the polyimide resin film was 201° C. The both end portions (10 mm) of the polyimide resin film having dispersed therein carbon black were superposed each other and the portions were adhered using a one part type elastic adhesive ("Super X 8008", trade name, manufactured by Cemedyne K.K. to obtain an endless belt. Furthermore, when using the endless belt, continuous printing was carried out on 3,000 recording papers, the resistance lowering amount of the paper traveling portion was 0.49 log Ω/□.

EXAMPLE 3

The film-forming base liquid obtained as in Example 1 was uniformly cased on a metal sheet, dried in an atmosphere of 120° C. for 120 minutes, and cured (causing imidation reaction) by further stepwise raising temperature as 150° C. for 30 minutes, 200° C. for 30 minutes, 220° C. for 30 minutes, and 280° C. for 20 minutes to obtain a polyimide resin film of 80 $\mu$m in thickness having a surface resistivity of $10^{11.8}$ Ω/□. The glass transition point of the polyimide resin film was 229° C. The both end portions (10 mm) of the polyimide resin film having dispersed therein carbon black were superposed each other and the portions were adhered using a one part type elastic adhesive ("Super X 8008", trade name, manufactured by Cemedyne K.K. to obtain an endless belt. Furthermore, when using the endless belt, continuous printing was carried out on 3,000 recording papers, the resistance lowering amount of the paper traveling portion was 0.61 log Ω/□.

EXAMPLE 4

The film-forming base liquid obtained as in Example 1 was uniformly cased on a metal sheet, dried in an atmosphere of 120° C. for 120 minutes, and cured (causing imidation reaction) by further stepwise raising temperature as 150° C. for 30 minutes, 200° C. for 30 minutes, 220° C. for 30 minutes, and 300° C. for 20 minutes to obtain a polyimide resin film of 80 $\mu$m in thickness having a surface resistivity of $10^{11.8}$ Ω/□. The glass transition point of the polyimide resin film was 240° C. The both end portions (10 mm) of the polyimide resin film having dispersed therein carbon black were superposed each other and the portions were adhered using a one part type elastic adhesive ("Super X 8008", trade name, manufactured by Cemedyne K.K. to obtain an endless belt. Furthermore, when using the endless belt, continuous printing wag carried out on 3,000 recording papers, the resistance lowering amount of the paper traveling portion was 0.95 log Ω/□.

Comparative Example 1

The film-forming base liquid obtained as in Example 1 was uniformly cased on a metal sheet, dried in an atmosphere of 120° C. for 120 minutes, and cured (causing imidation reaction) by further stepwise raising temperature as 150° C. for 30 minutes, 200° C. for 30 minutes, 220° C. for 30 minutes, and 330° C. for 20 minutes to obtain a polyimide resin film of 80 $\mu$m in thickness having a surface resistivity of $10^{11.8}$ Ω/□. The glass transition point of the polyimide resin film was 260° C. The both end portions (10 mm) of the polyimide resin film having dispersed therein carbon black were superposed each other and the portions were adhered using a one part type elastic adhesive ("Super X 8008", trade name, manufactured by Cemedyne K. K. to obtain an endless belt. Furthermore, when using the endless belt, continuous printing was carried out on 3,000 recording papers, the resistance lowering amount of the paper traveling portion was 1.19 log Ω/□.

Comparative Example 2

The film-forming base liquid obtained as in Example 1 was uniformly cased on a metal sheet, dried in an atmosphere of 120° C. for 120 minutes, and cured (causing imidation reaction) by further stepwise raising temperature as 150° C. for 30 minutes, 200° C. for 30 minutes, 220° C. for 30 minutes, and 360° C. for 20 minutes to obtain a polyimide resin film of 80 $\mu$m in thickness having a surface resistivity of $10^{11.8}$ Ω/□. The glass transition point of the polyimide resin film was 261° C. The both end portions (10 mm) of the polyimide resin film having dispersed therein carbon black were superposed each other and the portions were adhered using a one part type elastic adhesive ("Super X 8008", trade name, manufactured by Cemedyne K.K. to obtain an endless belt. Furthermore, when using the endless belt, continuous printing was carried out on 3,000 recording papers, the resistance lowering amount of the paper traveling portion was 1.24 log Ω/□.

Comparative Example 3

The film-forming base liquid obtained as in Example 1 was uniformly cased on a metal sheet, dried in an atmosphere of 120° C. for 120 minutes, and cured (causing imidation reaction) by further stepwise raising temperature as 150° C. for 30 minutes, 200° C. for 30 minutes, 220° C. for 30 minutes, and 380° C. for 20 minutes to obtain a polyimide resin film of 80 μm in thickness having a surface resistivity of $10^{11.8}$ Ω/□. The glass transition point of the polyimide resin film was 258° C. The both end portions (10 mm) of the polyimide resin film having dispersed therein carbon black were superposed each other and the portions were adhered using a one part type elastic adhesive ("Super X 8008", trade name, manufactured by Cemedyne K.K. to obtain an endless belt. Furthermore, when using the endless belt, continuous printing was carried out on 3,000 recording papers, the resistance lowering amount of the paper traveling portion was 1.70 log Ω/□.

Figure 2:
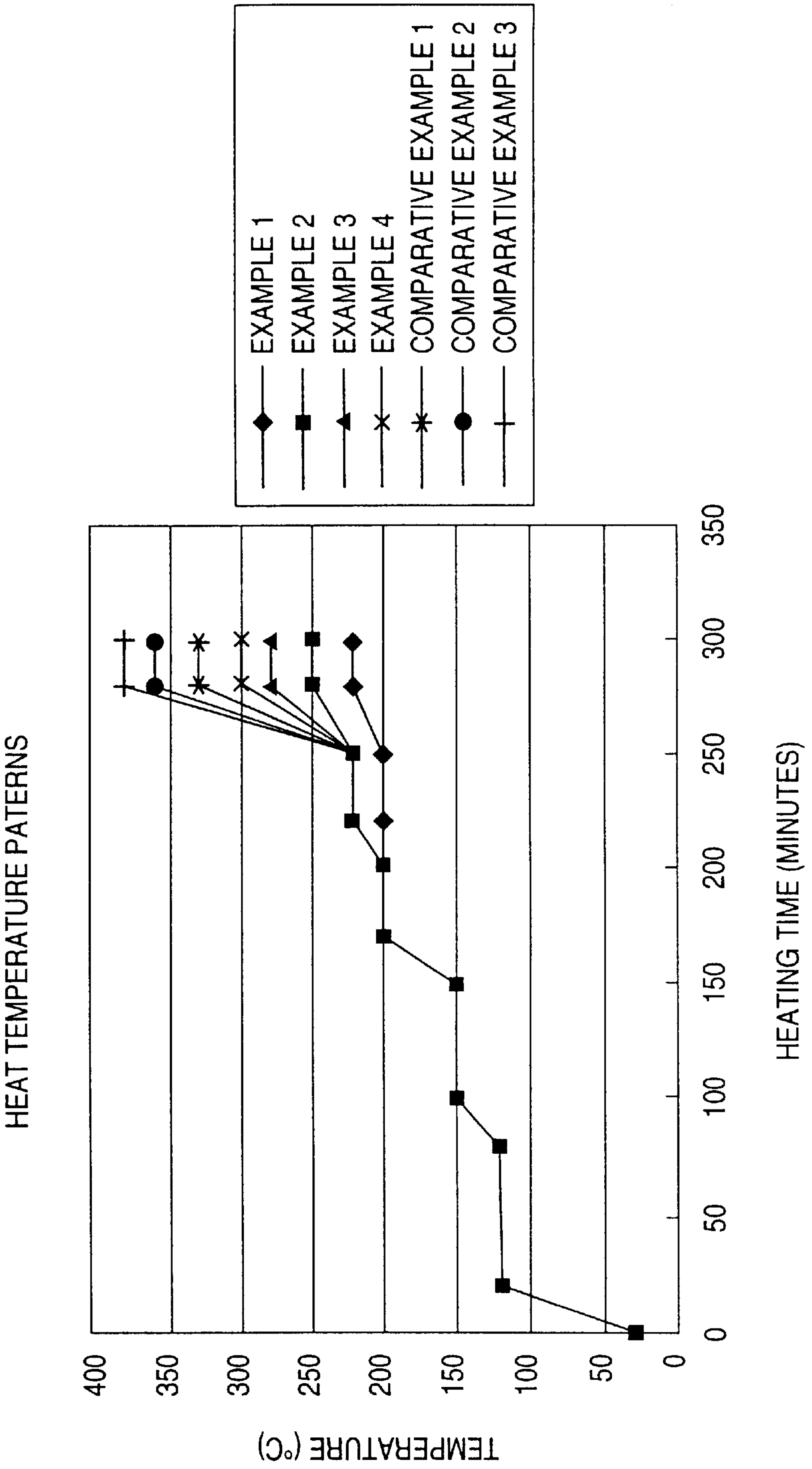
FIG. 2 is a view showing the heating patters of Examples 1, 2, 3, and 4 in this invention and Comparative Examples 1, 2, and 3.

FIG. 2 shows the heating patterns in Examples 1 to 4 and Comparative Examples 1 to 3.

Figure 3:
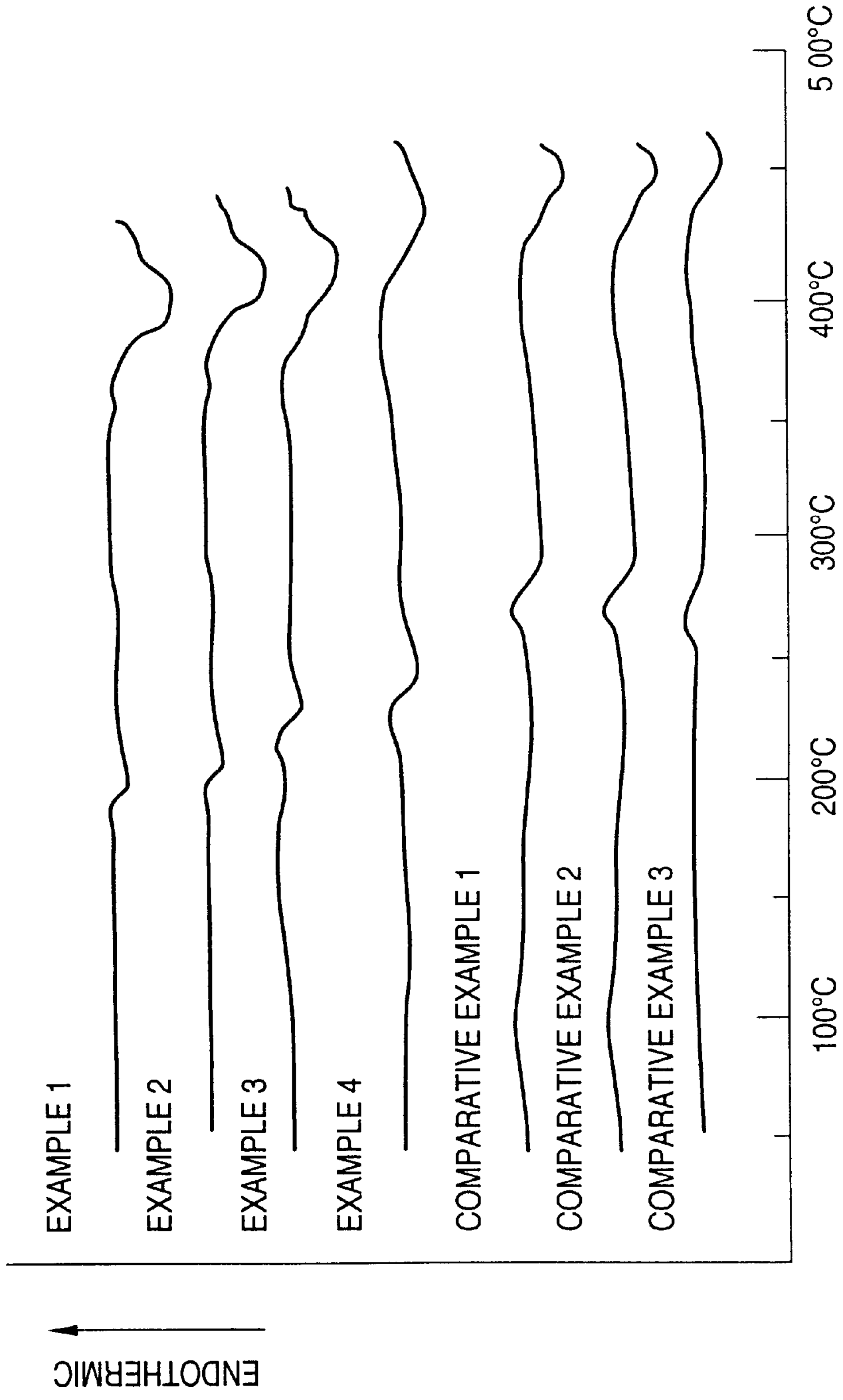
FIG. 3 is a view showing the results of the thermal analyses of polyimide resins in this invention each having a different heating temperature.

FIG. 3 shows the thermal analytical results of the polyimide resins in each of which the heating temperature differs. While the glass transition points of the polyimide resins heated to a temperature of 330° C. or higher, the glass transition points of the resins are near 260° C., as the heating temperature of the polyimide resins is lower, the glass transition points of the resins shift to a low-temperature side as when the peak heating temperature is 300° C., the glass transition point is 240° C., when the peak heating temperature is 280° C., the glass transition point is 229° C., when the peak heating temperature is 250° C., the glass transition point is 201° C., and when the peak heating temperature is 220° C., the glass transition point is 194° C.

Figure 4:
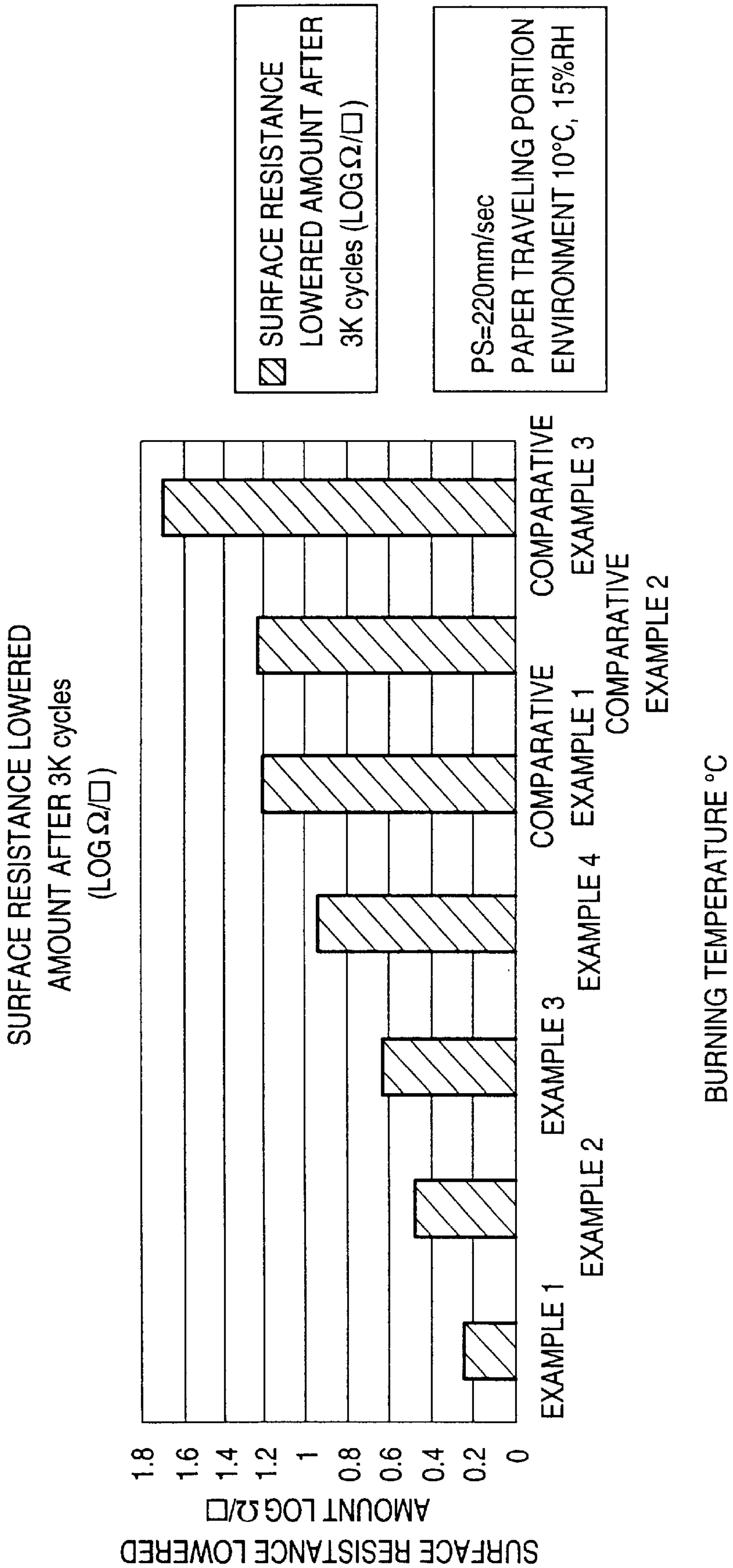
FIG. 4 is a view showing the lowered amounts of the surface resistivity of the paper traveling portion at continuous copying 3,000 papers using polyimide resins in this invention each having a different heating temperature.
Figure 5:
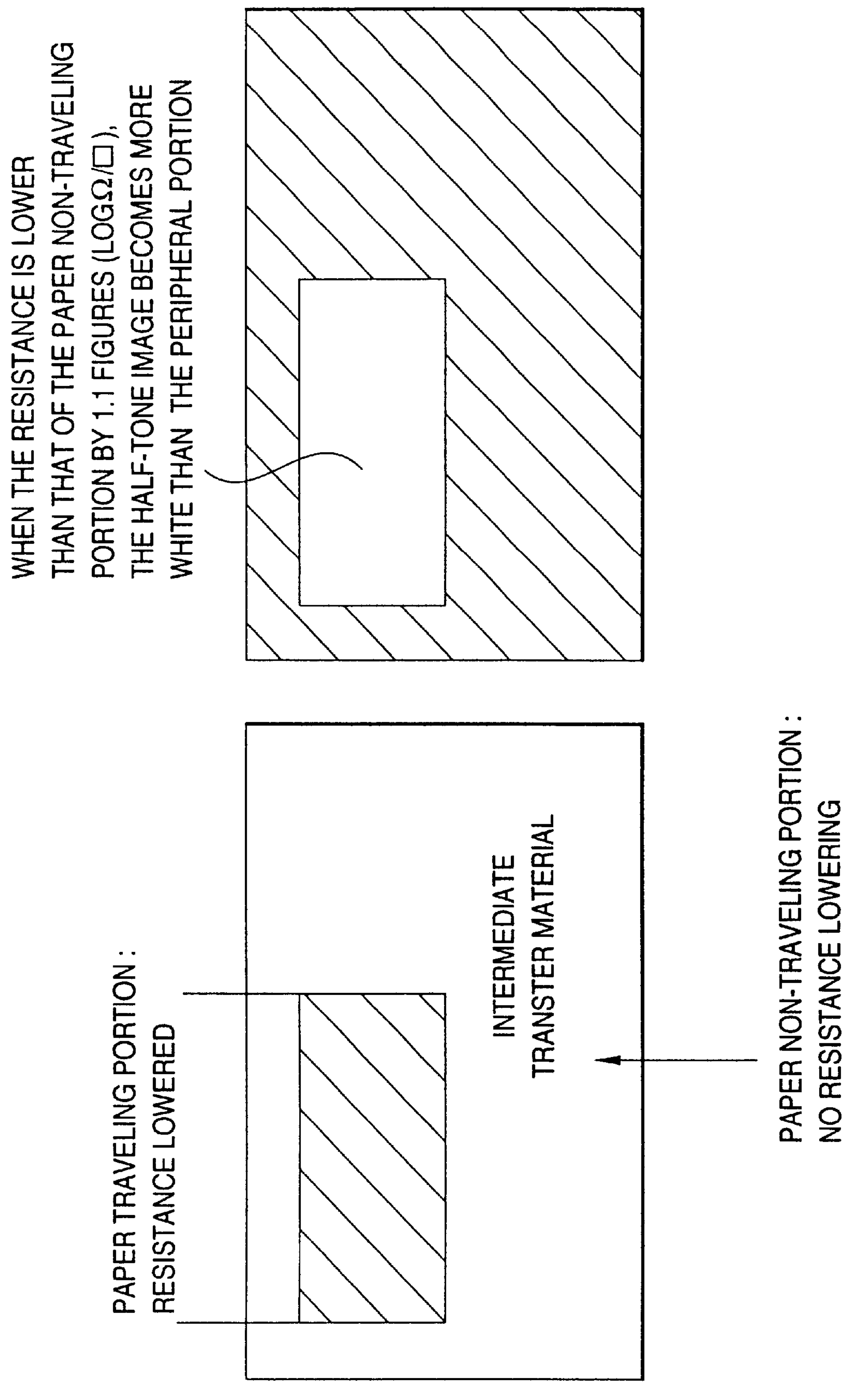
FIG. 5 us a view explaining the state of causing the white spots at the paper traveling portions after continuously copying 3,000 papers.
Figure 6:
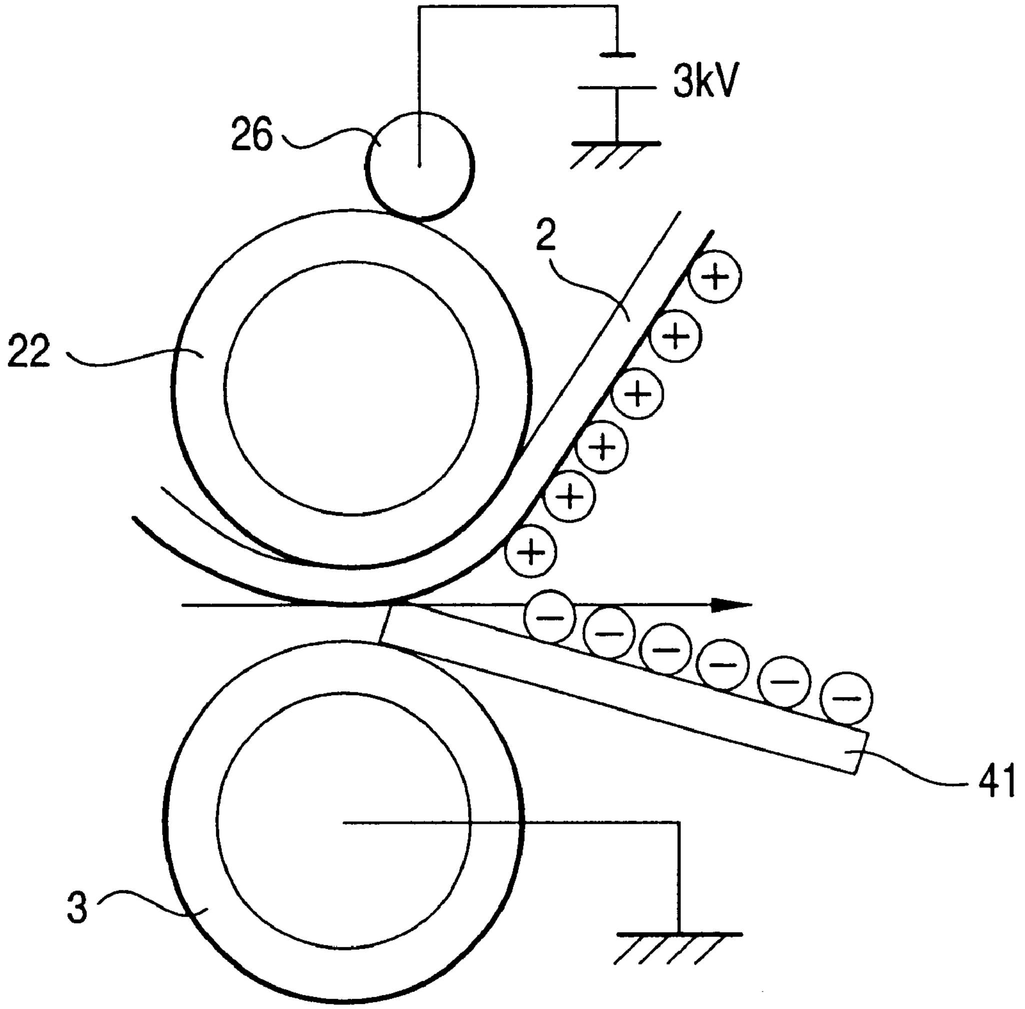
FIG. 6 is a view explaining lowering of the surface resistivity of the secondary transferring portions of intermediate transfer materials.

FIG. 4 shows the lowering amounts of the surface resistivities of the paper traveling portions at continuous copying 3,000 papers using the polyimide resins each having a different heated temperature as intermediate transfer materials. From the results shown in the figure, it can be seen that as the heating temperature (peak) for the polyamide resin is lower and the glass transition temperature of the polyimide resin is lower, the lowering amount of the surface resistivity is less.

As described above, in the present invention, because of using polyimide having a glass transition point of 245° C. or lower, an intermediate transfer material causing no lowering of resistance by transferring electric field can be provided and also an image-forming apparatus stably obtaining images having a high quality can be provided.

What is claimed is:

1. An intermediate transfer material that is disposed between a latent image-carrier and a recording medium so that a latent image formed on the latent image-carrier can be transferred to the intermediate transfer material and so that a toner image formed from the latent image can be transferred from the intermediate transfer material to the recording medium, wherein the intermediate transfer material is formed by a polyimide resin having dispersed therein an electrically conductive agent and having a glass transition temperature of 245° C. or lower, and wherein the polyimide resin is formed from a dehydrocondensation reaction occurring at less than 300° C.

2. The intermediate transfer material according to claim 1 wherein the polyimide resin is a polybiphenyltetracarboxylic acid-base polyimide resin obtained by a dehydrocondensation reaction of a biphenyltetracarboxylic acid dianhydride and an oxydianiline.

3. The intermediate transfer material according to claim 1 wherein the surface resistivity of the intermediate transfer material is in the range of from $10^{10}$ to $10^{14}$ Ω/□.

* * * * *